(12) United States Patent
Wilkins

(10) Patent No.: US 10,960,965 B1
(45) Date of Patent: Mar. 30, 2021

(54) DECELERATOR WITH INTERNAL STRUCTURE FOR REDIRECTING AIRFLOW

(71) Applicant: Kenneth A. Wilkins, Hurricane, WV (US)

(72) Inventor: Kenneth A. Wilkins, Hurricane, WV (US)

(*) Notice: Subject to any disclaimer, the term of this patent is extended or adjusted under 35 U.S.C. 154(b) by 0 days.

(21) Appl. No.: 16/875,689

(22) Filed: May 15, 2020

Related U.S. Application Data

(60) Provisional application No. 62/984,769, filed on Mar. 3, 2020.

(51) Int. Cl.
| | | |
|---|---|---|
| *B64D 17/02* | (2006.01) |
| *B64D 17/04* | (2006.01) |
| *B64D 17/72* | (2006.01) |
| *B64C 31/036* | (2006.01) |
| *B64B 1/40* | (2006.01) |
| *B64B 1/62* | (2006.01) |

(52) U.S. Cl.
CPC .................. *B64B 1/40* (2013.01); *B64B 1/62* (2013.01); *B64C 31/036* (2013.01); *B64D 17/025* (2013.01); *B64D 17/04* (2013.01); *B64D 17/72* (2013.01)

(58) Field of Classification Search
CPC ...... B64D 17/04; B64D 17/72; B64D 17/025; B64D 17/68; B64D 17/14; B64D 17/16; B64D 17/18; B64C 31/036
See application file for complete search history.

(56) References Cited

U.S. PATENT DOCUMENTS

| | | | | |
|---|---|---|---|---|
| 2,196,947 A | * | 4/1940 | Swofford | B64D 17/14 244/142 |
| 2,399,100 A | * | 4/1946 | Carr | 244/142 |
| 2,764,375 A | * | 9/1956 | Lemoigne | B64D 17/52 244/145 |
| 3,926,391 A | | 12/1975 | Nordine | |
| 4,105,173 A | * | 8/1978 | Bucker | A62B 1/22 182/3 |
| 4,175,722 A | | 11/1979 | Higgins | |
| 4,253,627 A | | 3/1981 | Matsuo | |
| 4,487,384 A | | 12/1984 | Astrand | |
| 4,705,238 A | | 11/1987 | Gargano | |

(Continued)

*Primary Examiner* — Richard R. Green
*Assistant Examiner* — William L Gmoser
(74) *Attorney, Agent, or Firm* — Stites & Harbison, PLLC; Terry L. Wright; Gary N. Stewart

(57) ABSTRACT

A decelerator for decelerating an attached payload includes a first canopy, a second canopy, and an internal structure for redirecting air entering the decelerator out of the decelerator and in a contraflow direction, which is cognate to the direction of travel. The first canopy defines an interior volume and includes a first opening for receiving a flow of air into the interior volume and a second opening for permitting received air to travel out of the interior volume. The second canopy is then positioned over the second opening, and the internal structure extends at least partially through the interior volume and interconnects the first canopy and the second canopy. Air within the internal structure is directed out of the decelerator in the contraflow direction. The internal structure can be constructed of a plurality of venturi tubes to increase the velocity at which air is emitted from the decelerator.

18 Claims, 10 Drawing Sheets

(56) References Cited

U.S. PATENT DOCUMENTS

| | | | | |
|---|---|---|---|---|
| 5,161,755 A | * | 11/1992 | Tsay | B64D 17/72 244/146 |
| 5,174,527 A | * | 12/1992 | Kasher | B64D 17/14 244/138 R |
| 5,890,678 A | | 4/1999 | Butler, Jr. | |
| 7,338,016 B2 | | 3/2008 | Berland | |
| 2003/0222178 A1 | * | 12/2003 | Chen | B64D 17/72 244/143 |
| 2008/0083847 A1 | * | 4/2008 | Mau | B64C 3/46 244/13 |
| 2008/0191098 A1 | * | 8/2008 | Babovka | B64C 31/0285 244/145 |
| 2016/0376012 A1 | * | 12/2016 | Liao | B64D 17/04 244/145 |

* cited by examiner

DECELERATOR WITH INTERNAL STRUCTURE FOR REDIRECTING AIRFLOW

CROSS-REFERENCE TO RELATED APPLICATIONS

The present application claims priority to U.S. Provisional Patent Application Ser. No. 62/984,769, filed Mar. 3, 2020, the entire disclosure of which is incorporated herein by reference.

TECHNICAL FIELD

The present invention relates to a decelerator for decelerating an attached payload. In particular, the present invention relates to a decelerator including an internal structure which redirects and emits incoming air in a contraflow direction to provide increased drag and more efficient deceleration.

BACKGROUND

Decelerators, such as parachutes, are commonly attached to and used to decelerate objects falling or traveling in a given direction of travel. To this end, decelerators often include a canopy, which, when deployed, fills with air to create drag and retards subsequent movement of the decelerator, and any object connected thereto, in the direction of travel. As the speed in which an object is traveling increases or the distance between the object and a stopping force (e.g., a ground surface) decreases, the need for rapid deceleration increases. Decelerators of known construction, however, often rely on the drag created by virtue of the decelerator interfacing with a stream of incoming air alone. Yet, in applications requiring the deceleration of payloads traveling at increased speeds, such as sonic or supersonic speeds, reliance on such passive drag force alone may be insufficient to provide the requisite deceleration necessary to ensure safe delivery of the payload. Moreover, in applications requiring deceleration of payloads during planetary entry, descent, and landing, reliance on increased surface area alone may be insufficient to achieve the drag necessary for safe delivery of larger or heavier payloads.

Accordingly, a decelerator including features which provide improved deceleration to ensure safe delivery of heavier payloads and/or payloads traveling at increased speeds would be both highly desirable and beneficial.

SUMMARY

The present invention is directed to a decelerator for decelerating an attached payload. In particular, the present invention relates to a decelerator including an internal structure which redirects and emits incoming air in a contraflow direction to provide increased drag and more efficient deceleration.

In some embodiments of the present invention, a decelerator is provided that generally comprises a first canopy, a second canopy, and an internal structure for redirecting air entering the decelerator out of the decelerator in a contraflow direction, which is generally cognate to the direction in which the decelerator is traveling. The first canopy defines an interior volume and includes a first opening for receiving a flow of air into the interior volume as well as a second opening for permitting received air to travel out of the interior volume. The second canopy is positioned over the second opening defined by the first canopy, such that at least some of the air flowing out of the interior volume interfaces with the second canopy and flows out of a passageway in a contraflow direction to provide increased drag, which, in turn, decelerates the decelerator.

The internal structure of the decelerator extends at least partially through the interior volume and interconnects the first canopy and the second canopy. The internal structure, as indicated above, is also configured to direct air received within the interior volume out of the decelerator in a contraflow direction, which, in turn, causes a reactive thrust force to be applied to the decelerator. As the decelerator is decelerated by virtue of both the reactive thrust force resulting from air being emitted in the contraflow direction as well as by virtue of the drag created by the materials of the decelerator interfacing with a stream of incoming air, the decelerator is consequently able to more rapidly decelerate an attached payload. To facilitate attachment of the payload, the decelerator can further comprise a plurality of lines, which are connected to the first canopy and to the internal structure.

In some exemplary embodiments, the internal structure comprises a plurality of tubes, where each tube includes an inlet for receiving air and an outlet for emitting air out of the decelerator. The tubes can be radially arranged about a central axis extending through the interior volume defined by the first canopy. To direct air received by the inlets out of the decelerator in a contraflow direction, the outlet of each tube is generally positioned outside of the interior volume of the first canopy. In some embodiments, each tube defining the internal structure curves as it extends from its inlet to its outlet. In this regard, each tube can be positioned such that it extends out of the interior volume through the second opening and over an edge of the first canopy so that air traveling through the respective tubes is directed through a passageway defined by the first canopy and the second canopy. To ensure that air emitted from the internal structure is evenly distributed about the decelerator and the direction of travel of the decelerator is not inadvertently altered, each tube of the internal structure is preferably positioned opposite another tube of the internal structure. In some embodiments, the tubes of the internal structure are arranged so that the inlets of adjacently positioned tubes abut one another and the outlets of adjacently positioned tubes are spaced apart from one another. In some embodiments, the dimensions of each tube are such that the velocity at which air is emitted from the outlets of the tubes is greater than the velocity at which air was initially received by the inlets. In this regard, such tubes subject air traveling therethrough to a venturi-effect and, in such embodiments, such tubes can thus also be referred to as venturi tubes or venturis.

In another embodiment of an exemplary decelerator described herein, the dimensions of each tube of the internal structure may be substantially uniform, such that air traveling through the respective tubes does not exhibit or undergo a venturi-effect and its velocity is not significantly increased as it proceeds through the tubes of the internal structure.

In yet further embodiments of the decelerators, the internal structure is comprised of a plurality of panel members, which define a plurality of pathways to redirect incoming air out of the decelerator in a contraflow direction. In one such embodiment, each panel member intersects with the other panel members at a central axis extending through the interior volume defined by the first canopy. The panel members then radially extend from the central axis to an interior surface of the first canopy to which the panel members are then attached. Each panel member also extends through and out of the interior volume to engage the second canopy to which each respective panel member is further attached. In some embodiments, the internal structure can further include a plurality of tapered walls, which extend between adjacent panel members and serve to guide air entering the decelerator proximal to the central axis towards the passageway for emission therefrom.

Further features and advantages of the present invention will become evident to those of ordinary skill in the art after a study of the description, figures, and non-limiting examples in this document.

DESCRIPTION OF EXEMPLARY EMBODIMENTS

The present invention is a decelerator for decelerating a payload. In particular, the present invention is a decelerator having an internal structure that redirects and emits incoming air in a contraflow direction to provide improved deceleration.

Figure 1:
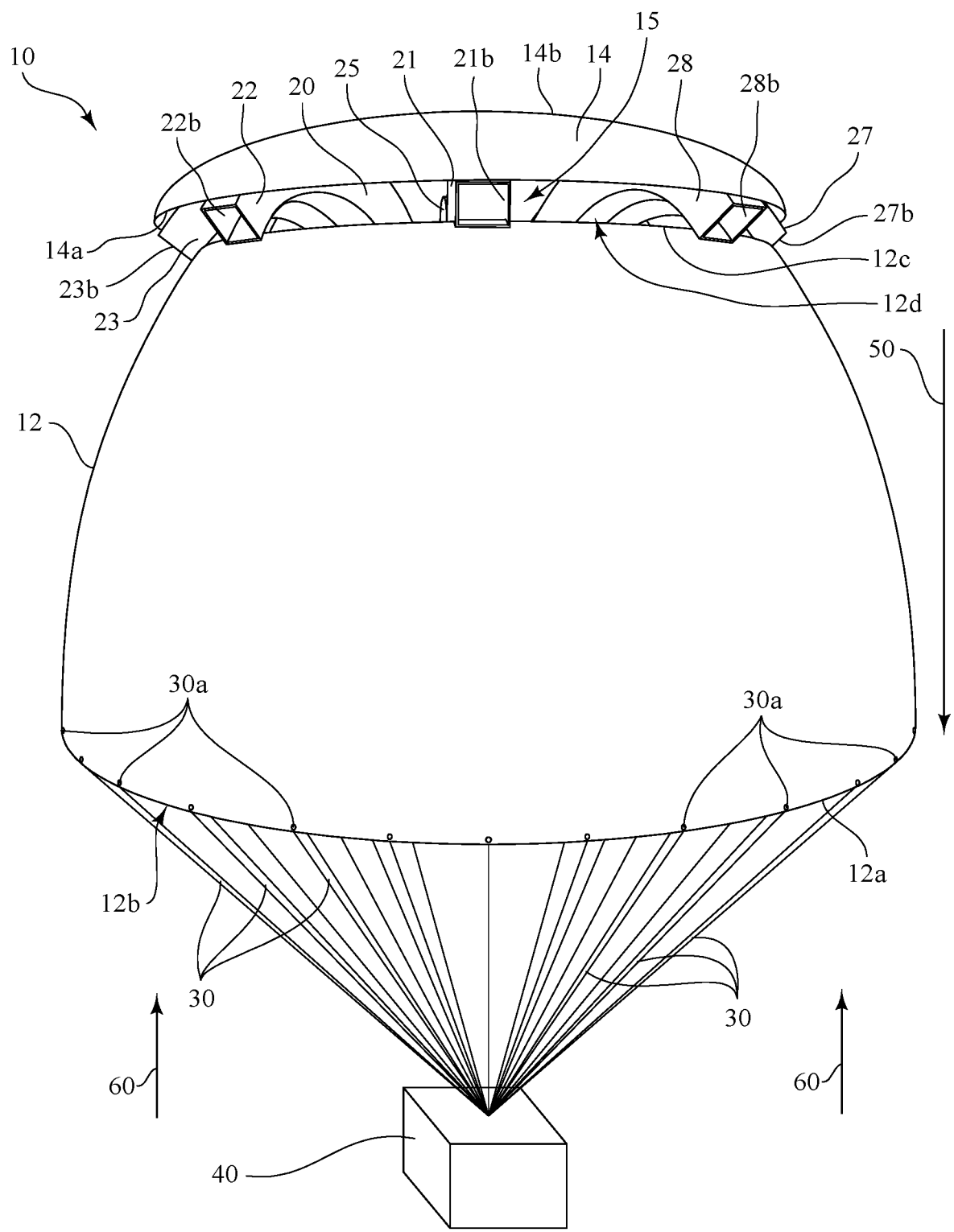
FIG. 1 is a perspective view of an exemplary decelerator including an internal structure for redirecting air and made in accordance with the present invention, and with a payload attached thereto.

Referring first to FIG. 1, in one exemplary embodiment of a decelerator 10 for decelerating a payload 40, the decelerator 10 comprises: a first canopy 12, a second canopy 14, and an internal structure 20 for redirecting air 60 entering the decelerator 10. The decelerator 10 further includes a plurality of lines 30, which are utilized to attach the payload 40, such as a crated package, to the decelerator 10. As the payload 40, and thus the decelerator 10 attached thereto, move in a direction of travel 50, which, in this case, is a downward direction, at least some of the air 60 entering the decelerator 10 is received, redirected, and subsequently emitted by the internal structure 20 outside of the decelerator 10 in a contraflow direction, as further described below.

As used herein, the term "contraflow direction" is used to refer to a direction which is generally opposite to the direction in which air 60 initially enters the decelerator 10 and thus cognate to the general direction (e.g., downward, upward, left-to-right, or right-to-left) in which the decelerator 10 is traveling. For example, as the payload 40 and decelerator 10 shown in the exemplary embodiment illustrated in FIG. 1 are moving in a downward direction of travel 50, with air 60 initially entering the decelerator 10 in an upward direction, subsequent emission of the air 60 in a generally downward direction would constitute emission of the air 60 in a contraflow direction. As a result of air 60 being emitted in a contraflow direction, a reactive thrust force is thus applied to the decelerator 10 in the opposite direction (i.e., a direction opposite of the direction in which the redirected air 60 is emitted). Emitting air 60 in a contraflow direction thus serves to multiply the drag acting on the decelerator 10 without the concomitant need for increased canopy surface area.

In some implementations, the decelerator 10 of the present invention can thus be utilized as and referred to as a parachute. Unlike typical parachutes, however, and as a result of the ability of the decelerator 10 to emit air 60 in a contraflow direction, the decelerator 10 of the present invention is able to more rapidly decelerate a payload 40 than parachutes of traditional construction. As such, the decelerator 10 of the present invention can be utilized in various aerospace or airborne applications requiring the deceleration of a payload's vertical descent (e.g., supply drops and capsule reentry) or in terrestrial applications requiring the deceleration of an object's horizontal movement (e.g., drag racing). Furthermore, and although discussed herein primarily with respect to the deceleration of payloads, it is appreciated that the decelerator 10 can, in some implementations, also be utilized in applications requiring the deceleration of an individual (e.g., skydiving).

Referring now to FIGS. 1-3 and 6, the first canopy 12 is typically comprised of a flexible material, such as nylon, and defines an interior volume 13 that can fill with air 60 to increase the drag imposed on the decelerator 10 as it proceeds in the direction of travel 50. The first canopy 12 includes a first edge 12a, which defines a first opening 12b that permits air 60 to enter the interior volume 13, and a second edge 12c, which defines a second opening 12d positioned opposite of the first opening 12b that permits air 60 to exit the interior volume 13 defined by the first canopy 12. The second canopy 14 is also comprised of a flexible material, such as nylon, that is positioned over and spaced apart from the second opening 12d, such that the first canopy 12 and the second canopy 14 define a passageway 15 through which air 60 entering the interior volume, but not captured by the internal structure 20, can subsequently pass to exit the decelerator 10, as indicated by dashed arrows 60a in FIG. 6. Of course, the materials from which the first canopy 12 and the second canopy 14 are constructed may be selected to accommodate specific applications or environments. As such, the first canopy 12 and/or the second canopy 14 can be comprised of other suitable materials, such as canvas, silk, Kevlar, terylene, or a blend of materials, appropriate for the selected application or intended environment without altering the principle operation of the decelerator 10. The foregoing list of materials is in no way, however, meant to be exhaustive or limiting.

Figure 6:
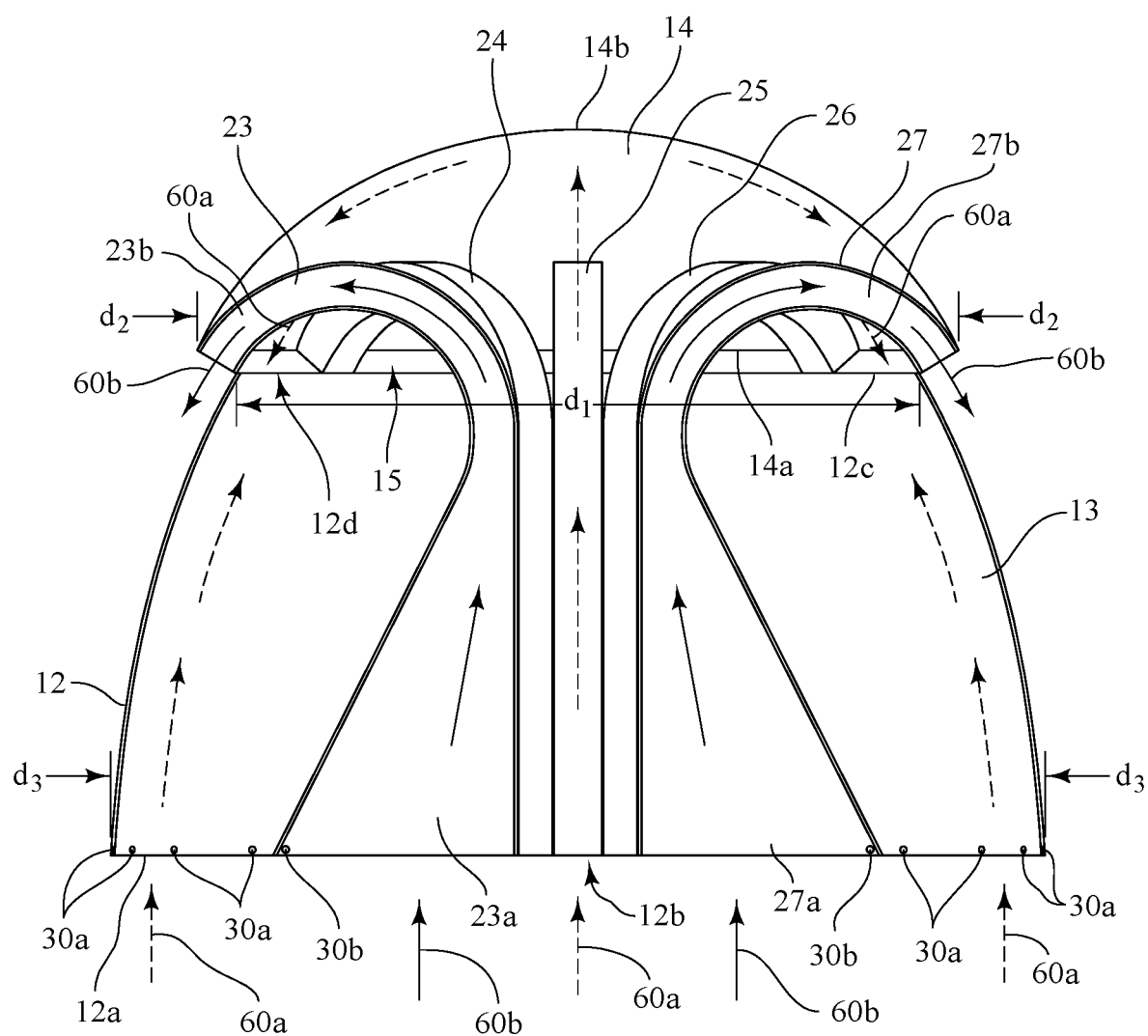
FIG. 6 is a sectional view of the exemplary decelerator of FIG. 1 taken along line 6-6 shown in FIG. 3.

Referring now more specifically to FIG. 6, in this exemplary embodiment, the second canopy 14 has a diameter $d_2$ which is larger than the diameter $d_1$ of the second opening 12d so that the second canopy 14 extends over the entirety of the second opening 12d. In this regard, the dimensions of the second canopy 14 relative to the second opening 12d serve to increase the overall drag which acts on the decelerator 10 while in motion by increasing the likelihood that air 60a passing through the interior volume 13, but not received by the internal structure 20, will interface with the second canopy 14 prior to exiting the decelerator 10 through the passageway 15. In this exemplary embodiment, the diameter $d_3$ of the first opening 12$b$ is greater than the diameter $d_1$ of the second opening 12$d$. As such, the diameter of the first canopy 12 decreases as the first canopy 12 extends from the first opening 12$b$ to the second opening 12$d$, causing the first canopy 12 to retain a bowl-like shape, which is open on both ends. Similarly, the diameter $d_2$ of the second canopy 14 decreases as it extends from its lower edge 14$a$ to its apex 14$b$, such that the second canopy 14 retains a generally convex shape. Accordingly, when the decelerator 10 is inflated, the decelerator 10 has a generally dome-like shape. Of course, one of skill in the art will readily appreciate that first canopy 12 and the second canopy 14 could also be alternatively shaped, but yet still permit the decelerator 10 to achieve its intended function.

Referring now generally to FIGS. 1-4 and 6, at least some of the air 60 entering the interior volume 13 of the first canopy 12 is received by the internal structure 20, which, as noted above, subsequently directs and emits the received air 60 outside of the decelerator 10 in a contraflow direction, as indicated by solid-line arrows 60$b$ in FIG. 6. To this end, the internal structure 20 includes inlets for receiving air 60 and an outlets positioned outside of the interior volume 13 for emitting the air 60 out of the decelerator 10. More specifically, the internal structure 20 comprises eight identical tubes 21, 22, 23, 24, 25, 26, 27, 28, with the sides of each tube 21, 22, 23, 24, 25, 26, 27, 28 having a central channel through which air 60 can flow through the length of the tube 21, 22, 23, 24, 25, 26, 27, 28. To facilitate the flow of air 60 through the central channel both the inlet 21$a$, 22$a$, 23$a$, 24$a$, 25$a$, 26$a$, 27$a$, 28$a$ and the outlet 21$b$, 22$b$, 23$b$, 24$b$, 25$b$, 26$b$, 27$b$, 28$b$ of each tube 21, 22, 23, 24, 25, 26, 27, 28 are open. Of course, and as described, for example, below with reference to FIG. 8, an exemplary internal structure can also be alternatively constructed with a different number or tubes or in a different configuration (e.g., using a plurality of panels) without departing from the spirit and scope of the subject matter described herein.

Referring now to FIGS. 1-6, each tube 21, 22, 23, 24, 25, 26, 27, 28 has an inlet 21$a$, 22$a$, 23$a$, 24$a$, 25$a$, 26$a$, 27$a$, 28$a$ for receiving air 60 and an outlet 21$b$, 22$b$, 23$b$, 24$b$, 25$b$, 26$b$, 27$b$, 28$b$ positioned outside of the interior volume 13 for emitting air 60 received by the inlet 21$a$, 22$a$, 23$a$, 24$a$, 25$a$, 26$a$, 27$a$, 28$a$ outside of the decelerator 10. The inlets 21$a$, 22$a$, 23$a$, 24$a$, 25$a$, 26$a$, 27$a$, 28$a$ of the respective tubes 21, 22, 23, 24, 25, 26, 27, 28 thus collectively define the overall inlet of the internal structure 20. Similarly, the outlets 21$b$, 22$b$, 23$b$, 24$b$, 25$b$, 26$b$, 27$b$, 28$b$ of the respective tubes 21, 22, 23, 24, 25, 26, 27, 28 collectively define the overall outlet of the internal structure 20.

Similar to the first canopy 12 and the second canopy 14, each tube 21, 22, 23, 24, 25, 26, 27, 28 is also comprised of a flexible material, such as nylon. Of course, like the first canopy 12 and the second canopy 14, the materials from which the tubes 21, 22, 23, 24, 25, 26, 27, 28 are constructed can be selected to accommodate specific applications or environments. As such, the respective tubes 21, 22, 23, 24, 25, 26, 27, 28 can also be comprised of other suitable materials, such as canvas, silk, Kevlar, terylene or a blend of materials, appropriate for the selected application or intended environment without altering the principle operation of the decelerator 10. Regardless of the particular material selected, however, the internal structure 20 is generally maintained in association with the first canopy 12 by way of a stitched or bonded connection (not shown) between the distal end each tube 21, 22, 23, 24, 25, 26, 27, 28 and the first canopy 12. Likewise, the internal structure 20 is maintained in association with the second canopy 14 by way of a stitched or bonded connection (not shown) between the distal end of each tube 21, 22, 23, 24, 25, 26, 27, 28 and the second canopy 14. Accordingly, the internal structure 20 serves to interconnect the first canopy 12 and the second canopy 14. In this exemplary embodiment, the respective tubes 21, 22, 23, 24, 25, 26, 27, 28 are also held in association with each other by a stitched or bonded connection (not shown). Stitching techniques and materials known within the art, such as those described within Federal Aviation Administration (2015). *Parachute Rigger Handbook: FAA-H*-8083-17*A Change* 1. U.S. Department of Transportation, Federal Aviation Administration, Airman Testing Standards Branch., which is incorporated herein by reference, can be employed to provide the various stitched connections referred to herein, while chemical adhesives and/or heat can be utilized to provide the various bonded connections.

Figure 2:
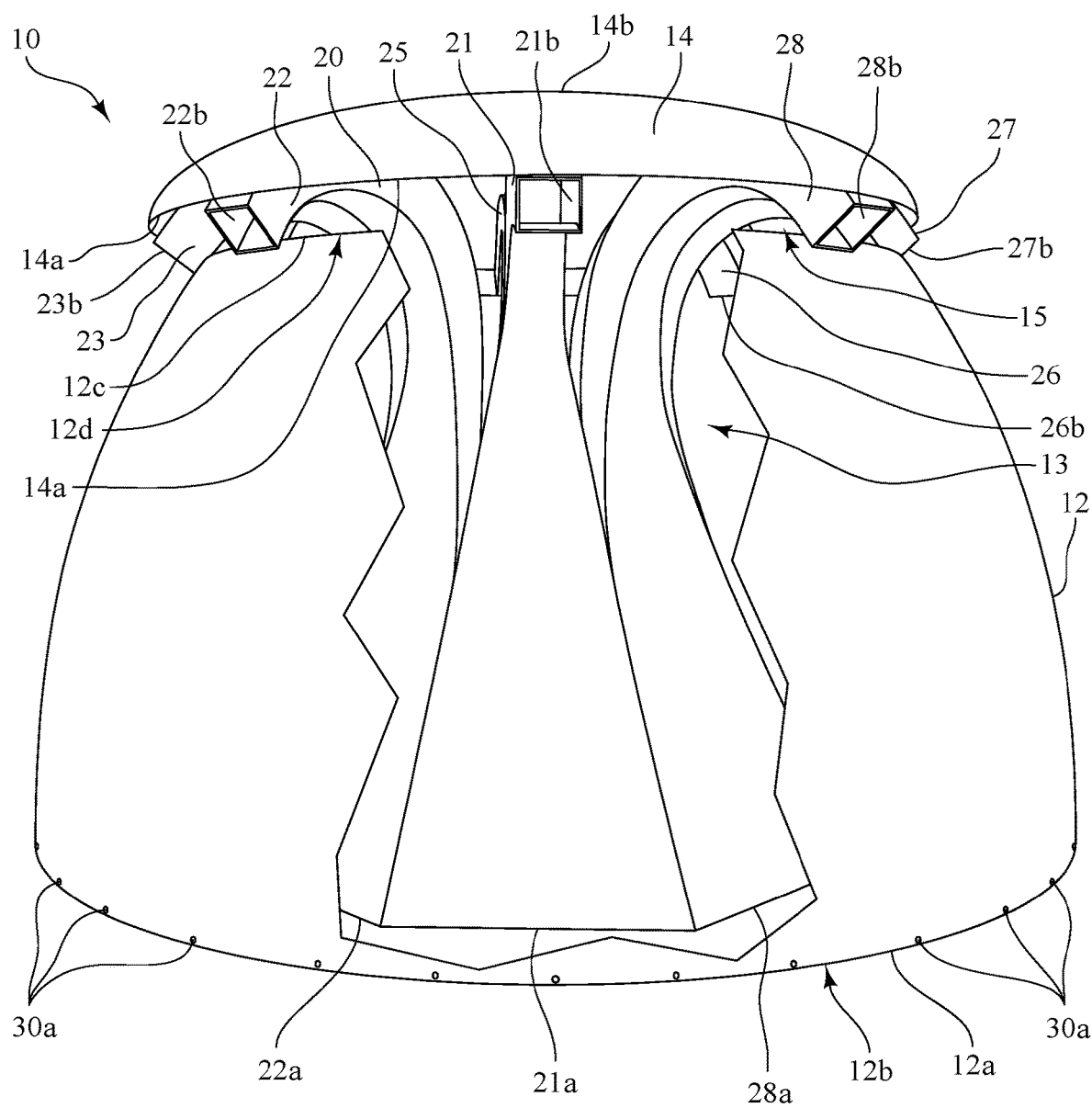
FIG. 2 is another perspective view of the exemplary decelerator of FIG. 1, but with a portion of the first canopy removed to show the internal structure of the decelerator.
Figure 3:
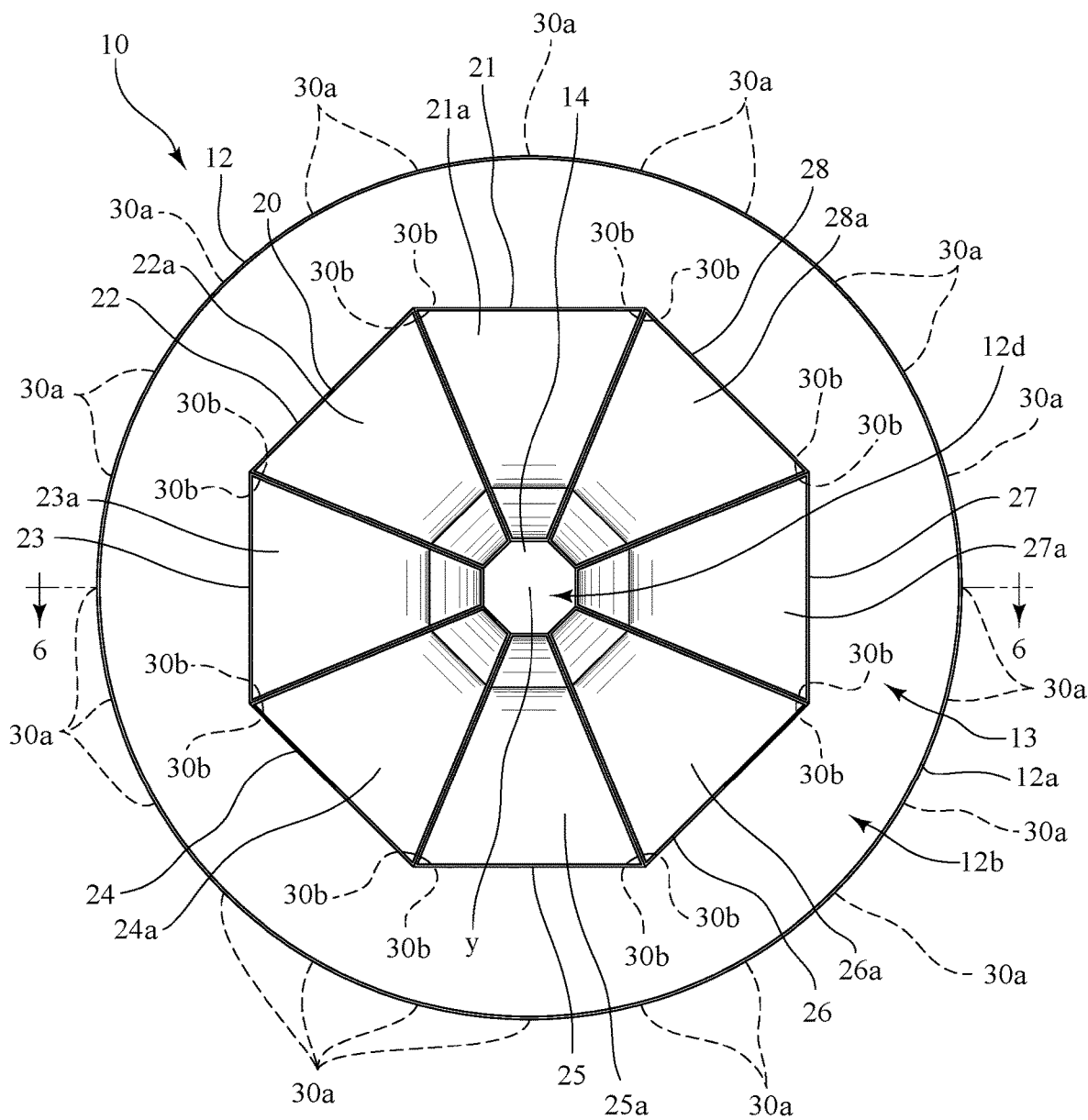
FIG. 3 is a bottom view of the exemplary decelerator of FIG. 1.
Figure 5:
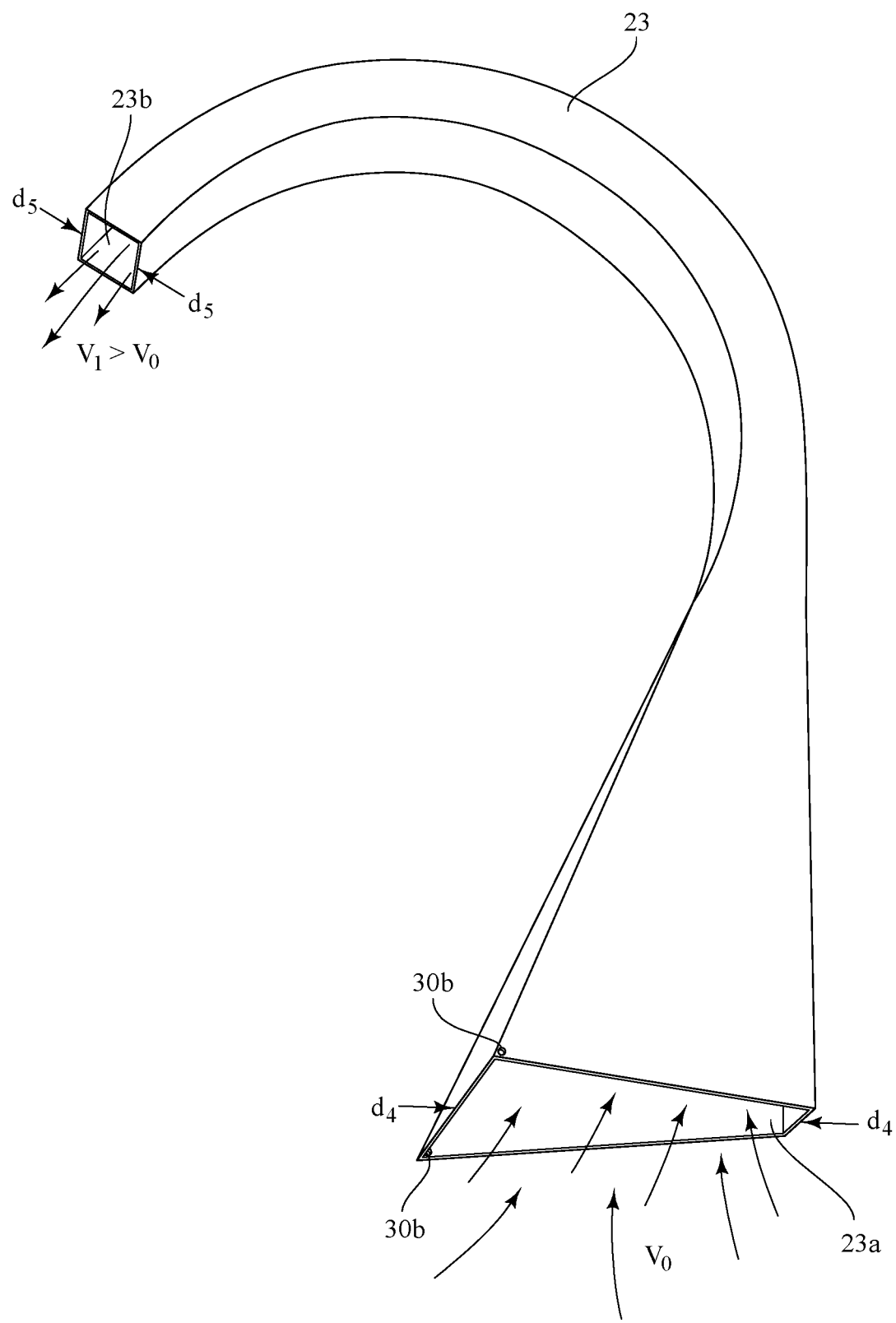
FIG. 5 is a perspective view of a tube of the internal structure shown in FIG. 4.

Referring now to FIGS. 1-3, 5, and 6, to ensure that the decelerator 10 deploys in an open configuration causing the first canopy 12 and the internal structure 20 to inflate with air 60, the plurality of lines 30 are generally attached around the periphery of the first canopy 12 proximate to the first edge 12$a$ and are generally attached around the periphery of the proximal end of the internal structure 20 proximate to the inlets 21$a$, 22$a$, 23$a$, 24$a$, 25$a$, 26$a$, 27$a$, 28$a$, as indicated, respectively, by dashed lines 30$a$, 30$b$ in FIG. 3. As further shown in FIG. 3, the attachment points 30$a$ of the first canopy 12 are equally spaced and arranged so that each attachment point 30$a$ is positioned opposite another attachment point 30$a$ when the decelerator 10 is deployed. Similarly, the attachment points 30$b$ around periphery of the proximal end of the internal structure 20 are also equally spaced and arranged so that each respective attachment point 30$b$ is positioned opposite another attachment point 30$b$ when the decelerator 10 is deployed. As shown in FIGS. 1 and 2, in this exemplary embodiment, the attachment points 30$a$ of the first canopy 12 are comprised of eyelets defined by the first canopy 12. Likewise, the attachment points 30$b$ of the internal structure 20 are also comprised of eyelets defined by the internal structure 20, as shown in FIGS. 5 and 6.

Referring now more specifically to FIGS. 1-3 and 6, to direct air received by the inlets 21$a$, 22$a$, 23$a$, 24$a$, 25$a$, 26$a$, 27$a$, 28$a$ through the interior volume 13 and out of the decelerator 10 in a contraflow direction, the outlet 21$b$, 22$b$, 23$b$, 24$b$, 25$b$, 26$b$, 27$b$, 28$b$ of each respective tube 21, 22, 23, 24, 25, 26, 27, 28 is positioned outside of the interior volume 13 such that each outlet 21$b$, 22$b$, 23$b$, 24$b$, 25$b$, 26$b$, 27$b$, 28$b$ faces downward in a manner similar to the first opening 12$b$ defined by the first canopy 12. Further, to this same end, each tube 21, 22, 23, 24, 25, 26, 27, 28 curves as it extends from its inlet 21$a$, 22$a$, 23$a$, 24$a$, 25$a$, 26$a$, 27$a$, 28$a$ to its outlet 21$b$, 22$b$, 23$b$, 24$b$, 25$b$, 26$b$, 27$b$, 28$b$. Each tube 21, 22, 23, 24, 25, 26, 27, 28 is also positioned so that it extends out of the interior volume 13 through the second opening 12$d$ and over the second edge 12$c$ of the first canopy 12, such that air 60 traveling through the respective tubes 21, 22, 23, 24, 25, 26, 27, 28 is directed through the passageway 15 and out of the decelerator 10. In this exemplary embodiment, the outlet 21$b$, 22$b$, 23$b$, 24$b$, 25$b$, 26$b$, 27$b$, 28$b$ of each respective tube 21, 22, 23, 24, 25, 26, 27 is positioned between first canopy 12 and the second canopy 14, such that each respective outlet 21$b$, 22$b$, 23$b$, 24$b$, 25$b$, 26$b$, 27$b$, 28$b$ is placed between an exterior surface of the first canopy 12 and the bottom edge 14$a$ of the second canopy 14. Each tube 21, 22, 23, 24, 25, 26, 27, 28 is also sized and positioned so that the inlet 21a, 22a, 23a, 24a, 25a, 26a, 27a, 28a of each tube 21, 22, 23, 24, 25, 26, 27, 28 is positioned to reside along the same plane as the first edge 12a of the first canopy 12. Thus, in this exemplary embodiment, each tube 21, 22, 23, 24, 25, 26, 27, 28 substantially extends through the entirety of the interior volume 13. It is appreciated, however, that, in alternative embodiments, some or all of the tubes 21, 22, 23, 24, 25, 26, 27, 28 defining the internal structure 20 may be alternatively sized or positioned so that the inlet 21a, 22a, 23a, 24a, 25a, 26a, 27a, 28a of one or more of the tubes 21, 22, 23, 24, 25, 26, 27, 28 is positioned above or extends below the first edge 12a of the first canopy 12 and still permit the decelerator 10 to function for its intended purpose.

Figure 4:
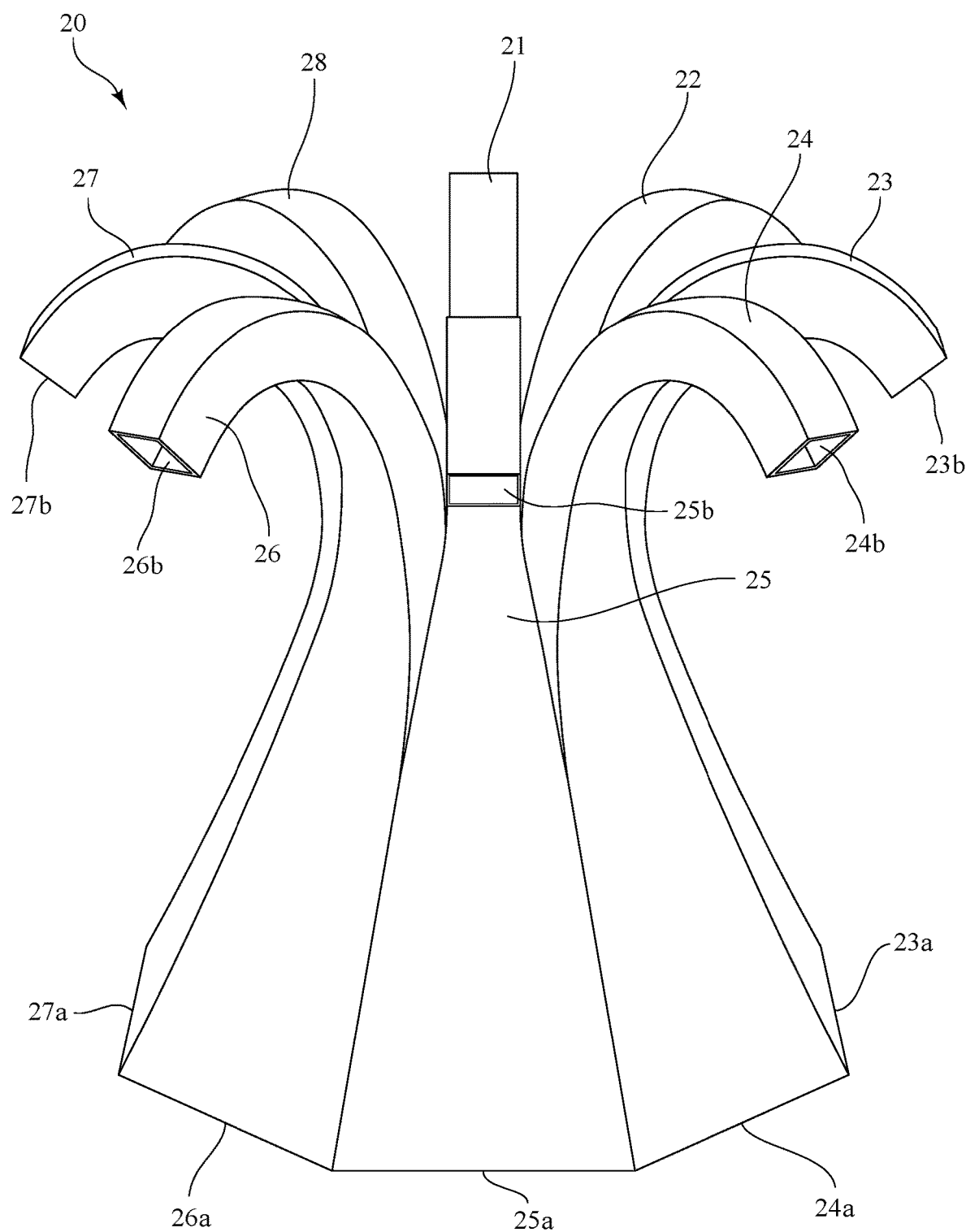
FIG. 4 is a perspective view of the internal structure for redirecting air of the exemplary decelerator of FIG. 1.

Referring now to FIGS. 2-4, each respective tube 21, 22, 23, 24, 25, 26, 27, 28 is positioned opposite of another tube 21, 22, 23, 24, 25, 26, 27, 28 defining the internal structure 20. Such an arrangement serves to ensure that the reactive thrust force applied to the decelerator 10 due to the emission of air 60 from the outlets 21b, 22b, 23b, 24b, 25b, 26b, 27b, 28b in a contraflow direction is evenly distributed about the decelerator 10, such that the direction of travel 50 of the payload 40 and decelerator 10 is not inadvertently altered.

Further, the respective tubes 21, 22, 23, 24, 25, 26, 27, 28 are also equally spaced apart from one another, and are arranged radially and equally spaced apart from a central axis, y, that extends through the interior volume 13, as perhaps best shown in FIG. 3. In particular, the tubes 21, 22, 23, 24, 25, 26, 27, 28 are clustered together about the central axis, y, such that the inlets 21a, 22a, 23a, 24a, 25a, 26a, 27a, 28a of adjacently positioned tubes 21, 22, 23, 24, 25, 26, 27, 28 abut one another and such that the internal structure 20 generally extends through a central portion of the interior volume 13. It is appreciated, however, that the tubes 21, 22, 23, 24, 25, 26, 27, 28 defining the internal structure 20 can be alternatively positioned and still permit the decelerator 10 to achieve its intended operation. For example, in some embodiments, the tubes 21, 22, 23, 24, 25, 26, 27, 28 may be positioned and/or shaped so that the inlets 21a, 22a, 23a, 24a, 25a, 26a, 27a, 28a are equally spaced apart from one another around the perimeter of the first opening 12b.

Depending on the intended application and anticipated speeds at which the payload 40 is anticipated to travel, it can also be desirable to increase the velocity at which air 60 is emitted from the outlets 21b, 22b, 23b, 24b, 25b, 26b, 27b, 28b relative to the velocity at which the air 60 enters the inlets 21a, 22a, 23a, 24a, 25a, 26a, 27a, 28a. To this end, the dimensions of the respective tubes 21, 22, 23, 24, 25, 26, 27, 28 can be adjusted at the time of manufacture to adjust the flow area available at different points along the interior of the tubes 21, 22, 23, 24, 25, 26, 27, 28 and affect the velocity at which air is emitted from the outlets 21b, 22b, 23b, 24b, 25b, 26b, 27b, 28b and the overall drag imposed on the decelerator 10.

For example, as shown in FIG. 5, to accommodate payloads traveling at or below subsonic speeds, in this exemplary embodiment, the diameter or opening of the third tube 23 generally decreases as it extends from its inlet 23a to its outlet 23b, such that the inlet 23a has an opening or diameter $d_4$ which is larger than the opening or diameter $d_5$ of the outlet 23b. Due to the decrease in flow area between the inlet 23a and the outlet 23b, the velocity $V_1$ of air 60 exiting the third tube 23 through the outlet 23b will thus be greater than the velocity $V_0$ of the air 60 upon initial entry into the inlet 23a (i.e., $V_1 > V_0$). Of course, the first tube 21, the second tube 22, the fourth tube 24, the fifth tube 25, the sixth tube 26, the seventh tube 27, and the eighth tube 28 are each similarly fabricated (as shown in FIGS. 4 and 6) and manipulate the velocity of air 60 traveling therethrough in the same manner as the third tube 23. The various tubes 21, 22, 23, 24, 25, 26, 27, 28 illustrated in FIGS. 1-6 and described herein with reference to the exemplary decelerator 10 thus cause air 60 traveling therethrough to exhibit a venturi-effect. In this regard, such tubes 21, 22, 23, 24, 25, 26, 27, 28 can also be referred to as venturi tubes or venturis. As used herein, the term "venturi tube" or "venturis" are used interchangeable used to refer to any tube or similarly-shaped structure having a convergent area followed by a subsequent narrow body portion, which, in turn, causes air or other fluids exiting the structure to be emitted at a higher velocity than the velocity at which the air or fluid initially entered the structure.

Referring still to FIGS. 1-6, in some embodiments, the dimensions of each respective tube 21, 22, 23, 24, 25, 26, 27, 28 are such that, during preliminary simulation tests, the velocity of the air 60 emitted from each respective tube 21, 22, 23, 24, 25, 26, 27, 28 was approximately four times to eight times greater than the velocity of such air 60 upon its initial entry into the tube 21, 22, 23, 24, 25, 26, 27, 28. Of course, the dimensions of the respective tubes 21, 22, 23, 24, 25, 26, 27, 28 can be adjusted as needed to accommodate a specific application and regulate the degree to which the velocity of the air 60 increases as it proceeds through the internal structure 20.

Figure 7:
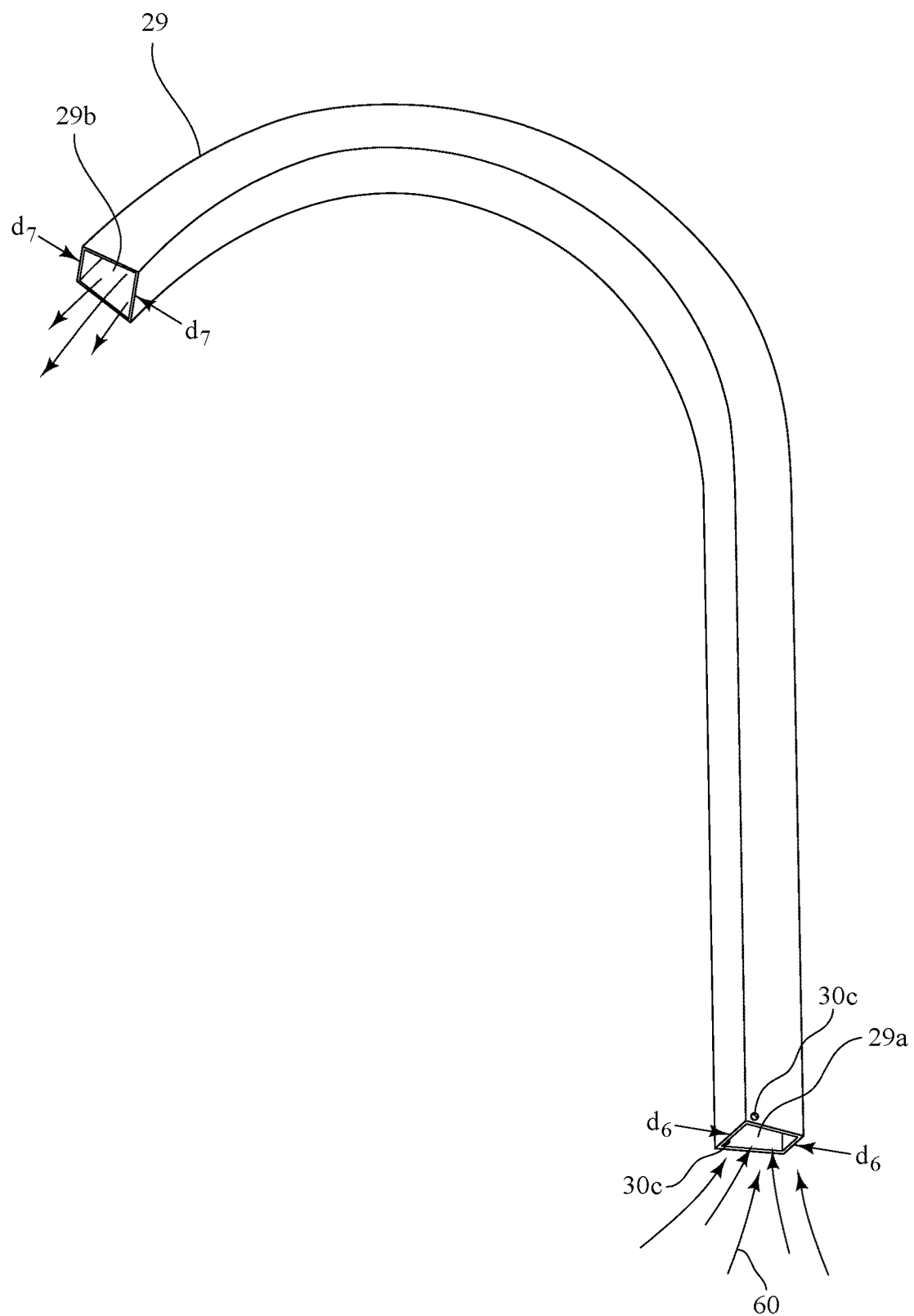
FIG. 7 is a perspective view of an alternative tube included in an internal structure for redirecting air and made in accordance with the present invention.

Turning now to FIG. 7, FIG. 7 shows an isolated view of an alternative tube 29 design which may be utilized in the construction of another exemplary internal structure made in accordance with the present invention. In this embodiment, the internal dimension or diameter of the alternative tube 29 is uniform throughout. As such, the opening or diameter $d_6$ of the inlet 29a of the alternative tube 29 is equal to that of the opening or diameter $d_7$ of the outlet 29b of the alternative tube 29. Accordingly, because the available flow area through the interior of the alternative tube 29 is consistent throughout, the velocity of any air 60 entering the alternative tube 29 will not be significantly increased as it proceeds through the alternative tube 29 and will thus not exhibit a venturi-effect. Due to the uniform diameter, such alternative tube design can facilitate simpler manufacture and thus reduce the overall cost associated with manufacturing the internal structure 20. In this regard, the use of such an alternative tube 29 design may be desirable in applications where a payload 40 is traveling at speeds where the need for an increase in velocity as air travels through the alternative tube 29 is not required. Of course, to facilitate the attachment of the plurality of lines 30, the alternative tube 29 similarly includes attachment points 30c, which, in this case, are eyelets defined by the alternative tube 29.

Accordingly, in some embodiments, an internal structure defined by a plurality of alternative tubes 29 can be provided and utilized within the exemplary decelerator 10 in place of the internal structure 20 described above with reference to FIGS. 1-4 and 6 and which makes use of venturi tubes 21, 22, 23, 24, 25, 26, 27, 28. In such embodiments, the alternative internal structure is maintained in association with, and serves to interconnect, the first canopy 12 and the second canopy 14 in the same manner as the internal structure 20 described above with reference to FIGS. 1-4 and 6.

Figure 8:
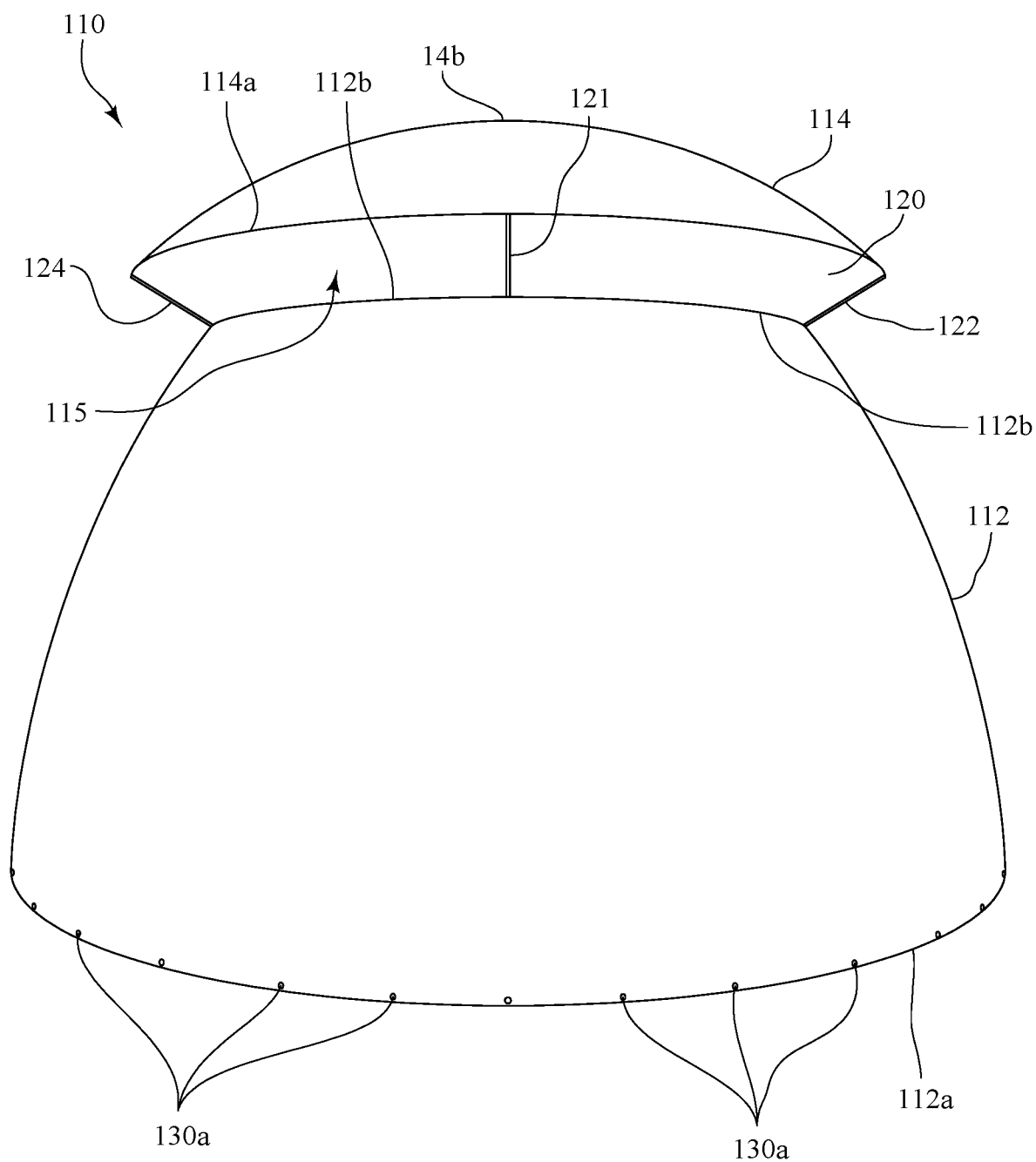
FIG. 8 is a perspective view of another exemplary decelerator including an internal structure for redirecting air and made in accordance with the present invention.
Figure 9:
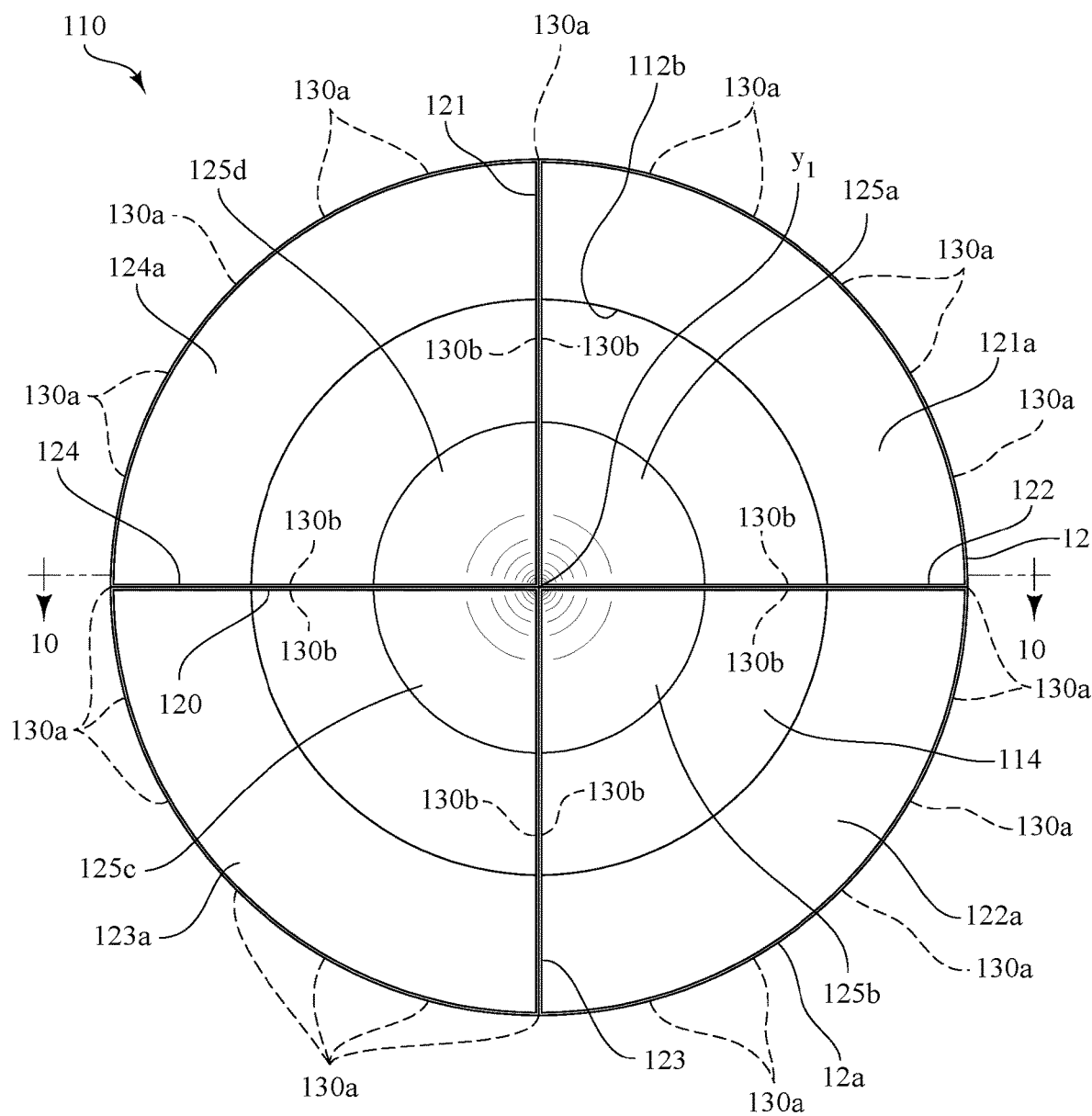
FIG. 9 is a bottom view of the exemplary decelerator of FIG. 8.
Figure 10:
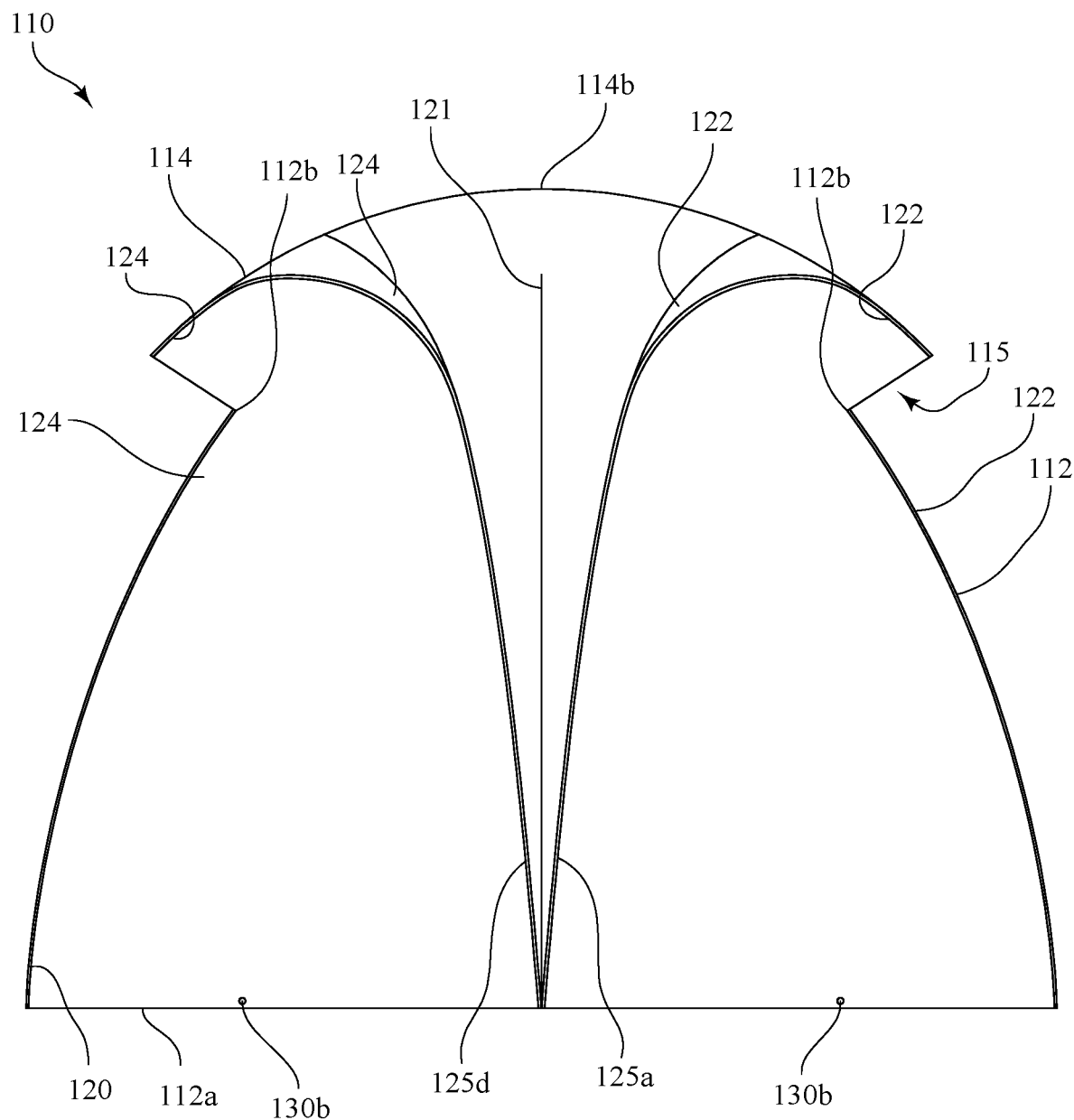
FIG. 10 is a sectional view of the exemplary decelerator of FIG. 8 taken along line 10-10 shown in FIG. 9.

FIGS. 8-10 show various views of another exemplary decelerator 110 for decelerating a payload made in accordance with the present invention. Like the decelerator 10 described above with reference to FIGS. 1-3 and 6, the decelerator 110 in this exemplary embodiment also comprises a first canopy 112, a second canopy 114, and an internal structure 120 for redirecting air entering the decelerator 110. The first canopy 112 includes a first edge 112a, which defines a first opening that permits air into the interior volume defined by the first canopy 112, and a second edge 112b, which defines a second opening positioned opposite of the first opening that permits air to exit the interior volume. As further shown in FIGS. 8-10, the decelerator 110 includes a plurality of attachment points 130a, 130b defined by the first canopy 112 and the internal structure 120 to which a plurality of lines for attaching a payload to the decelerator 110 can be secured. Accordingly, the first canopy 112 and the second canopy 114 of the decelerator 110 generally include a number of the same features and provide the same functionality as that of the first canopy 12 and the second canopy 14 described above with reference to FIGS. 1-4 and 6. However, as described below, the internal structure 120 of this exemplary decelerator 110 differs from the internal structure 20 of the decelerator 10 shown in FIGS. 1-4 and 6.

In the exemplary decelerator 110 shown in FIGS. 8-10, the internal structure 120 is defined by a plurality of panel members 121, 122, 123, 124. Specifically, in this exemplary embodiment, the respective panel members 121, 122, 123, 124 work in conjunction with the first canopy 112 and the second canopy 114 to redirect incoming air out of the decelerator 110 in a contraflow direction. Accordingly, because the internal structure 120 in this embodiment is constructed by a plurality of panels 121, 122, 123, 124, as opposed to tubes, the internal structure 120 in this embodiment generally requires less materials than that of the decelerator 10 described above. As such, the exemplary decelerator 110 illustrated in this embodiment generally weighs less and can be manufactured more easily than the exemplary decelerator 10 described above with reference to FIGS. 1-3 and 6.

The internal structure 120 includes four identical panel members 121, 122, 123, 124: a first panel member 121; a second panel member 122; a third panel member 123; and a fourth panel member 124. Each panel member 121, 122, 123, 124 intersects with the other panel members 121, 122, 123, 124 at a central axis, $y_1$, extending longitudinally through an interior volume defined by the first canopy 112, as shown best in FIG. 9. In this way, the respective panel members 121, 122, 123, 124 are typically connected together at the central axis, $y_1$, by a stitched or bonded connection, although other suitable means of connecting the respective panel members 121, 122, 123, 124 can also be used. Each respective panel 121, 122, 123, 124 is also typically comprised of a flexible material, such as nylon. Of course, materials from which the respective panels 121, 122, 123, 124 are constructed can be selected to accommodate specific applications or environments as well. As such, the respective panels 121, 122, 123, 124 can again be comprised of other suitable materials, such as canvas, silk, Kevlar, terylene, or a blend of materials, appropriate for the selected application or intended environment without altering the principle operation of the decelerator 110.

Each pair of adjacently positioned panel members 121, 122, 123, 124 define a pathway 121a, 122a, 123a, 124a within the internal structure 120, where each pathway 121a, 122a, 123a, 124a serves to guide a flow of air through the interior and subsequently out of the decelerator 110. In this embodiment, the four panel members 121, 122, 123, 124 thus define four pathways 121a, 122a, 123a, 124a: a first pathway 121a defined by the first panel member 121 and the second panel member 122; a second pathway 122a defined by the second panel member 122 and the third panel member 123; a third pathway 123a defined by the third panel member 123 and the fourth panel member 124, and a fourth pathway 124a defined by the fourth panel member 124 and the first panel member 121. As shown in FIG. 9, the respective panel members 121, 122, 123, 124 are configured such that the four pathways, 121a, 122a, 123a, 124a are equally sized.

Referring now specifically to FIGS. 9 and 10, the respective panel members 121, 122, 123, 124 radially extend from the central axis, $y_1$, to an interior surface of the first canopy 112. A portion of each panel member 121, 122, 123, 124 is connected, e.g., by way of a stitched or bonded connection, to the interior surface of the first canopy 112. Each panel member 121, 122, 123, 124 also extends through and out of the interior volume defined by the first canopy 112 to engage the second canopy 114. Each panel member 121, 122, 123, 124 is then connected, e.g., by way of a stitched or bonded connection, to the interior surface of the second canopy 114. Accordingly, like the internal structure shown in FIGS. 1-4 and 6, the internal structure 120 in this exemplary embodiment also serves to interconnect the first canopy 112 and the second canopy 114. The first canopy 112 and the second canopy 114 are preferably connected to the respective panel members 121, 122, 123, 124 in a manner which substantially encloses the pathways 121a, 122a, 123a, 124a, such that only the ends of the pathways 121a, 122a, 123a, 124a are left open to permit entry of air initially into and subsequently out of the decelerator 110.

Referring still to FIGS. 9 and 10, as a further refinement, in this exemplary embodiment, the internal structure 120 further includes a plurality of tapered walls 125a, 125b, 125c, 125d, each serving to guide air entering the decelerator 110 proximate to the central axis, $y_1$, towards a passageway 115 defined by the upper edge 112b of the first canopy 112 and the lower edge 114a of the second canopy 114 for emission therefrom in a contraflow direction. Specifically, in this exemplary embodiment, the internal structure 120 includes four tapered walls 125a, 125b, 125c, 125d: a first tapered wall 125a extending between and connected to the first panel member 121 and the second panel member 122; a second tapered wall 125b extending between and connected to the second panel member 122 and the third panel member 123; a third tapered wall 125c extending between and connected to the third panel member 123 and the fourth panel member 124; and a fourth tapered wall 125d extending between and connected to the fourth panel member 124 and the first panel member 121. The width of each tapered wall 125a, 125b, 125c, 125d gradually increases as the tapered wall 125a, 125b, 125c, 125d extends towards second canopy 114 and the uppermost portion of each tapered wall 125a, 125b, 125c, 125d is connected to the second canopy 114, as shown best in FIG. 9.

As perhaps shown best in FIG. 10, the uppermost portion of each tapered wall 125a, 125b, 125c, 125d, in this exemplary embodiment, diverges away from the apex 114b of the second canopy 114 before connecting to an interior surface of the second canopy 114 to gradually introduce air guided along the tapered walls 125a, 125b, 125c, 125d into contact with the interior surface of the second canopy 114. Each tapered wall 125a, 125b, 125c, 125d may be connected to the two panel members 121, 122, 123, 124 to which it corresponds and the second canopy 114 by way of a stitched or bonded connection, or other suitable connection means. To this end, each tapered wall 125a, 125b, 125c, 125d is also typically comprised of a flexible material, such as nylon. Of course, the materials from which the tapered walls 125a, 125b, 125c, 125d are constructed may be selected to accommodate specific applications or environments. As such, each respective tapered wall 125a, 125b, 125c, 125d can be similarly comprised of other suitable materials, such as canvas, silk, Kevlar, terylene, or a blend of materials, appropriate for the selected application or intended environment without altering the principle operation of the decelerator 10.

One of ordinary skill in the art will recognize that additional embodiments and implementations are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A decelerator for decelerating an attached payload moving in a direction of travel, comprising:
    a first canopy defining an interior volume, a first opening for receiving a flow of air into the interior volume, and a second opening permitting the flow of air out of the interior volume;
    a second canopy positioned over the second opening; and
    an internal structure comprising a plurality of tubes configured to direct the flow of air through the interior volume and outside of the decelerator in a contraflow direction, with each tube of the plurality of tubes interconnecting the first canopy and the second canopy and extending at least partially through the interior volume.

2. The decelerator according to claim 1, wherein the second opening is positioned opposite of the first opening and the internal structure extends out of the interior volume through the second opening.

3. The decelerator according to claim 1, wherein each tube of the plurality of tubes includes an inlet and an outlet, and wherein each respective tube of the plurality of tubes has a curved shape as the tube extends from the inlet to the outlet.

4. The decelerator according to claim 3, wherein the outlet of each tube of the plurality of tubes is positioned between the first canopy and the second canopy.

5. The decelerator according to claim 1, wherein each tube of the plurality of tubes is a venturi tube.

6. The decelerator according to claim 1, wherein the plurality of tubes are radially arranged about a central axis extending through the interior volume of the first canopy.

7. The decelerator according to claim 6, wherein each tube of the plurality of tubes is positioned opposite another tube of the plurality of tubes.

8. The decelerator according to claim 6, wherein each tube of the plurality of tubes is positioned adjacent to another tube of the plurality of tubes, wherein each tube of the plurality of tubes includes an inlet and an outlet, and wherein the inlets of adjacently positioned tubes abut one another and the outlets of the adjacently positioned tubes are spaced apart from one another.

9. The decelerator according to claim 1, further comprising a plurality of lines for attaching the payload to the decelerator, each line of the plurality of lines being connected to at least one of the first canopy and the internal structure.

10. A decelerator for decelerating an attached payload moving in a direction of travel, comprising:
    a first canopy defining an interior volume, a first opening for receiving a flow of air, and a second opening positioned opposite the first opening and permitting a flow of air out of the interior volume;
    a second canopy positioned over the second opening; and
    an internal structure comprising a plurality of tubes, each tube of the plurality of tubes extending at least partially through the interior volume and interconnecting the first canopy and the second canopy, wherein each tube of the plurality of tubes includes an inlet for receiving the flow of air and an outlet positioned outside of the interior volume for emitting the flow of air in a contraflow direction.

11. The decelerator according to claim 10, wherein a diameter of each tube of the plurality of tubes decreases as the tube extends from the inlet to the outlet.

12. The decelerator according to claim 10, wherein an edge of the first canopy defines the second opening, and wherein each tube of the plurality of tubes is curved, such that an end of each tube of the plurality of tubes extends out of the interior volume and over the edge.

13. The decelerator according to claim 12, wherein each tube of the plurality of tubes is positioned opposite another tube of the plurality of tubes.

14. The decelerator according to claim 13, wherein the plurality of tubes are radially arranged and equally spaced about a central axis extending through the interior volume.

15. The decelerator according to claim 14, wherein each tube of the plurality of tubes is positioned adjacent to another tube of the plurality of tubes, and wherein the inlets of adjacently positioned tubes of the plurality of tubes abut one another and the outlets of adjacently positioned tubes of the plurality of tubes are spaced apart from one another.

16. A decelerator for decelerating an attached payload moving in a direction of travel, comprising:
    a first canopy defining an interior volume, a first opening for receiving a flow of air, and a second opening positioned opposite of the first opening;
    a second canopy positioned over the second opening; and
    an internal structure for directing the flow of air outside of the decelerator in a contraflow direction, the internal structure comprising a plurality of panel members, with each panel member of the plurality of panel members extending at least partially through the interior volume and interconnecting the first canopy and the second canopy.

17. The decelerator according to claim 16, wherein the plurality of panel members radially extend from a central axis extending through the interior volume to the first canopy.

18. The decelerator according to claim 16, wherein the plurality of panel members defines at least four pathways for directing the flow of air through the interior volume.

* * * * *